United States Patent
Takano (10) Patent No.: US 7,253,990 B2
(45) Date of Patent: Aug. 7, 2007

(54) BOTTOM POLE STRUCTURE WITH RECESSED SECTION

(75) Inventor: Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 447 days.

(21) Appl. No.: 10/789,076

(22) Filed: Feb. 27, 2004

(65) Prior Publication Data

US 2005/0190492 A1  Sep. 1, 2005

(51) Int. Cl.
*G11B 5/147* (2006.01)
(52) U.S. Cl. ........................................ 360/126
(58) Field of Classification Search ............... 360/125, 360/126
See application file for complete search history.

(56) References Cited

U.S. PATENT DOCUMENTS

| | | | |
|---|---|---|---|
| 5,995,342 A | 11/1999 | Cohen et al. ............... | 360/126 |
| 6,317,289 B1 | 11/2001 | Sasaki ........................ | 360/126 |
| 6,553,649 B1 | 4/2003 | Santini ..................... | 29/603.14 |
| 6,724,572 B1* | 4/2004 | Stoev et al. ................ | 360/126 |
| 6,909,579 B2* | 6/2005 | Lee et al. .................... | 360/126 |
| 2003/0151852 A1* | 8/2003 | Sasaki et al. ............... | 360/126 |
| 2003/0193739 A1* | 10/2003 | Chen et al. ................. | 360/122 |
| 2004/0100730 A1* | 5/2004 | Okai et al. .................. | 360/126 |
| 2005/0099727 A1* | 5/2005 | Dovek et al. ............... | 360/126 |

* cited by examiner

*Primary Examiner*—Julie Anne Watko
(74) *Attorney, Agent, or Firm*—Saile Ackerman LLC; Stephen B. Ackerman (57) ABSTRACT

To generate a high data transfer rate from a magnetic write head, a faster flux rise time is needed. This often brings about severe excess saturation of the head and, as a result, adjacent track erasures often occur. This problem has been overcome by indenting P1 away from the ABS so that there is a narrowing of P1 near, but not all the way to, the write gap. This causes the excess flux associated with high write currents to be diverted into P2 instead the P1 shoulder.

32 Claims, 8 Drawing Sheets

BOTTOM POLE STRUCTURE WITH RECESSED SECTION

FIELD OF THE INVENTION

The invention relates to the general field of magnetic write heads with particular reference to improving track density.

BACKGROUND OF THE INVENTION

To enable increases in the recording density achieved by a magnetic head, the coercivity of the recording media must be increased to overcome the demagnetization field of the magnetic transition. However as the track width decreases, so does the head field. When a high-end hard disk drive (HDD) generates a high data transfer rate, in the order of 1 Gbit/s, or more, not only is greater head field strength required, but there also is a need for a faster flux rise time. In order to achieve a large enough overwrite value, even in such high frequency conditions, the write current is boosted, giving its waveform a large overshoot. This often brings about severe excess saturation of the head and, as a result, adjacent track erasures often occur.

Figure 1:
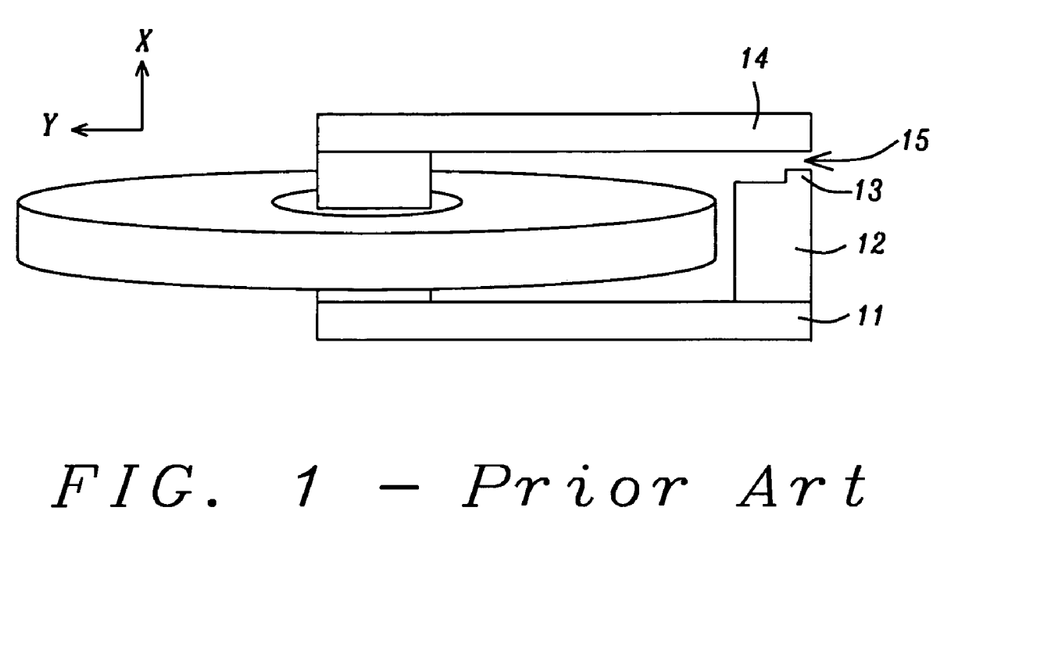
FIGS. 1 and 2 show two views of a planar write head of the prior art.
Figure 2:
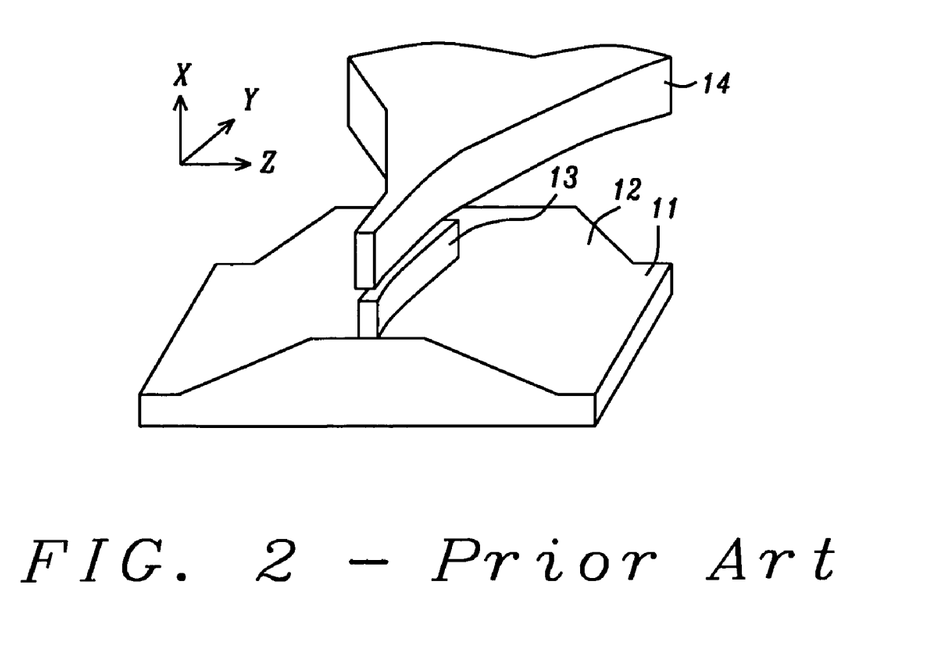

FIG. 1 is a schematic illustration of a conventional planar write head while FIG. 2 shows a closeup of the vicinity of the pole tip region. The design implements a bottom pole 11 (P1), pedestal 12 (P1P) and small throat height region 13 (for flux concentration), which opposes plane top pole 14 (P2)across from write gap 15. These poles are made of soft magnetic materials such as Ni, Co, Fe or their composites. The coil layer is packed onto the P1, and the P2 pole is fabricated on a planar surface to allow good track width control for the P2 tip width definition. The write gap material is a non-magnetic conductor such Cu, Au, Al, Cr, Rh or their composite.

Figure 3:
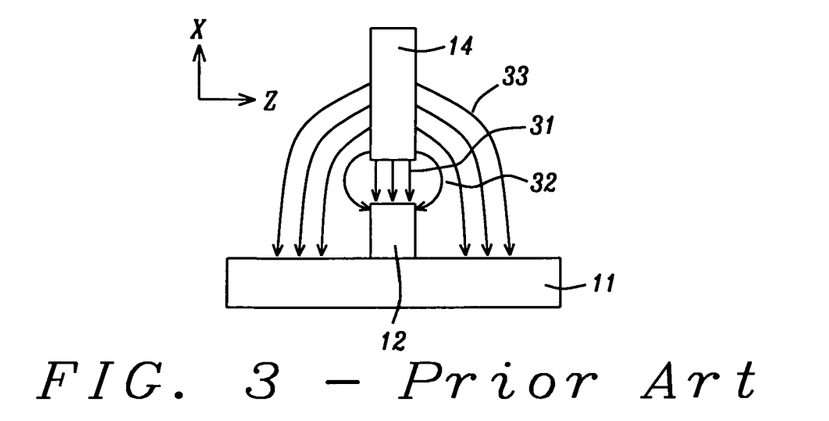
FIG. 3 shows different leakage paths for the flux between P1 and P2.

In a conventional planar write head, there are 3 kinds of flux leakage paths between the P1 and P2 pole at the air bearing surface (ABS), as shown is FIG. 3. Leakage path 31 is from P1 to P2, some of which contributes to writing on a magnetic medium. Leakage path 32 is flux flow from the P2 side to the P1 side wall. Leakage path 33 is flux from the P2 side wall to the PI P top boundary (P1 shoulder), because the P1 shoulder is coupled with the P2 side wall magnetically due to the structure. This flux path induces the concentration of the field just at the upper side of the P1 shoulder.

Figure 4:
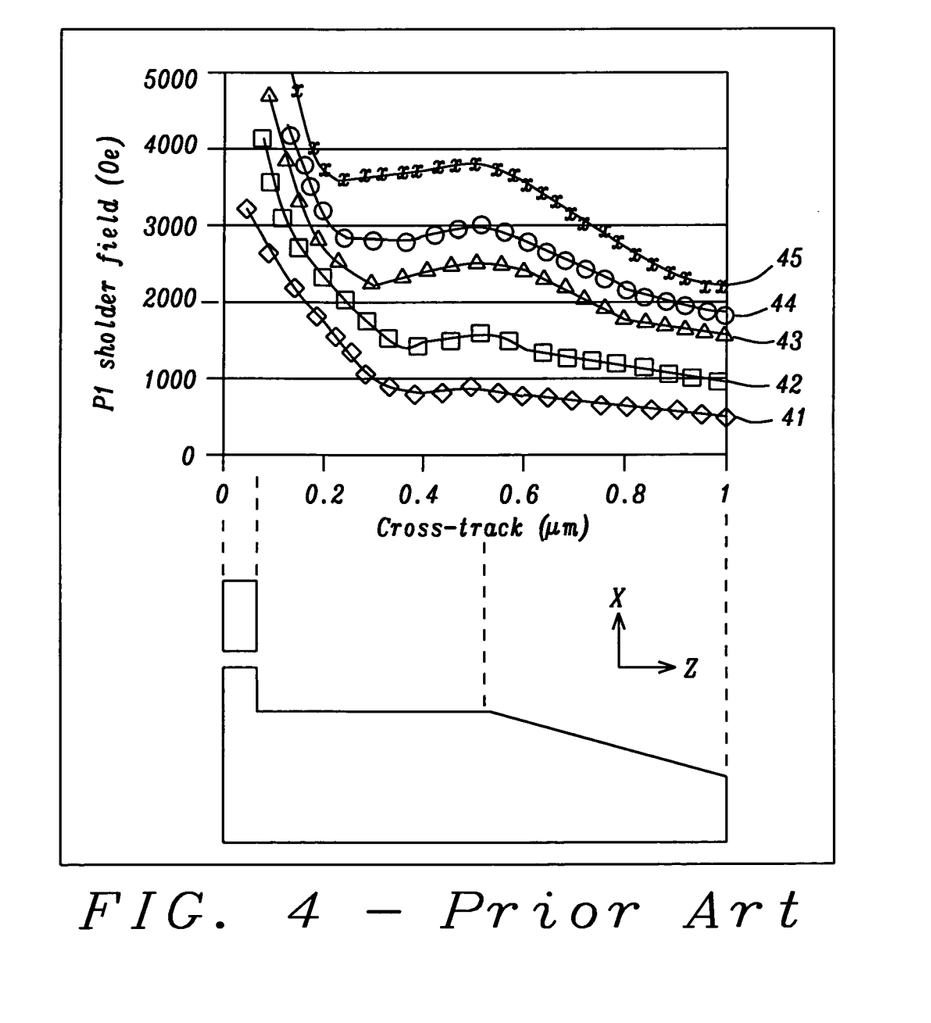
FIG. 4 plots the write field (of a prior art device) as a function of distance from the write gap, illustrating how there is a peak in the vicinity of the P1 shoulder.

FIG. 4 shows cross track profiles 41-45 of the in-plane field at the upper side of the P1 shoulder for write currents (Iw) of 10, 20, 30, 40, and 60 mA, respectively. The x-axis cross track corresponds to the position illustrated in the lower portion of the figure. This Pl shoulder field has greater strength than the gap side field (from the P2 side to P1 side wall), and grows with a shallow peak around the P1 shoulder corner, from which the shoulder steps down gradually, as the write current increases. From this profile, the P1 shoulder field can become a possible source of erasures, not only at adjacent tracks but also at 2 or 3 tracks away.

The present invention discloses a way to remedy the undesirable problem of the P1 shoulder field in the high write current region.

A routine search of the prior art was performed with the following references of interest being found:

In U.S. Pat. No. 6,553,649, Santini shows recessing of the first pole. Cohen et al disclose etched regions around the first pole in U.S. Pat. No. 5,995,342 while Sasaki describes recessed regions around P1 in U.S. Pat. No. 6,317,289.

SUMMARY OF THE INVENTION

It has been an object of at least one embodiment of the present invention to provide a magnetic write head whose write width does not change significantly at high write currents.

Another object of at least one embodiment of the present invention has been that said write head be able to tolerate severe excess saturation without causing any adjacent track erasure.

These objects have been achieved by indenting P1 away from the ABS so that there is a narrowing of P1 near, but not all the way to, the write gap. This causes the excess flux associated with high write currents to be diverted into P2 instead the P1 shoulder.

DESCRIPTION OF THE PREFERRED EMBODIMENTS

We now disclose four embodiments of a novel P1 structure for a planar write head.

Figure 5A:
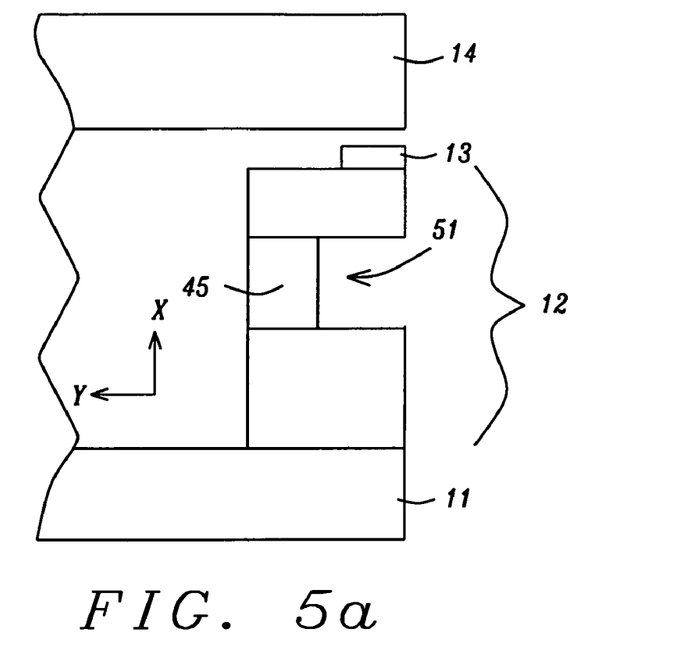
FIGS. 5a and 5b show a first embodiment of the invention, featuring a recess or indentation in the ABS, which brings about a narrowing of P1 near, but not all the way to, the write gap.
Figure 5B:
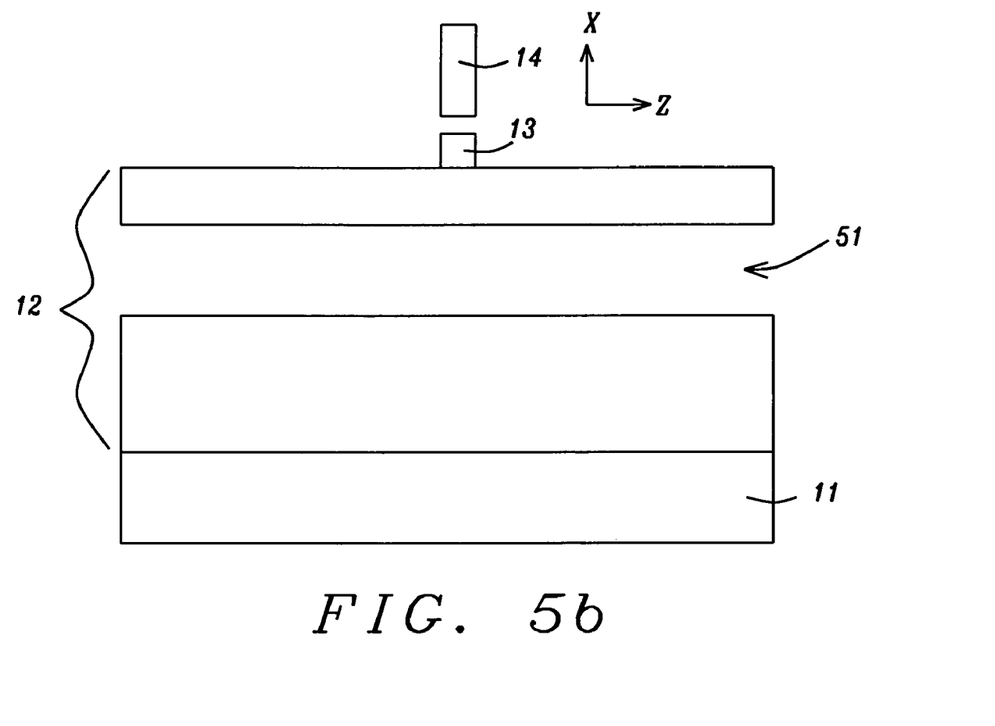

FIG. 5a shows the cross section and FIG. 5b the ABS view of a typical example of the new P1 pole structure. The P1 pedestal's ABS includes a partial indentation, or recess, 51 away from the ABS, the structure being characterized by the dimensions of the various sub-structures that, together, make up the P1 pedestal. The recessed region 51 of the P1 pedestal is filled with a nonmagnetic material.

$1^{st}$ Embodiment

Figure 6:
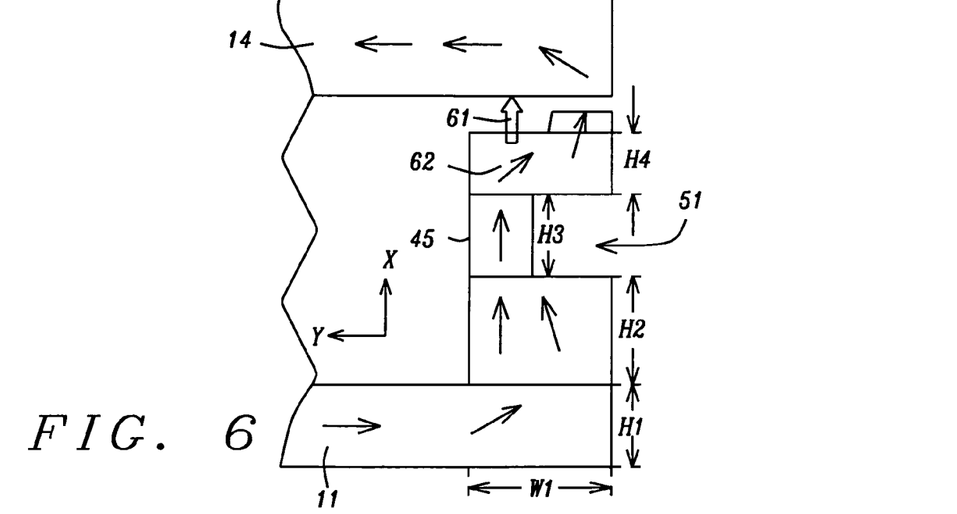
FIG. 6 shows how the structure of FIG. 5 causes excess flux associated with high write currents to be diverted into P2 instead the P1 shoulder.

The way the new design feature works is explained by the illustration in FIG. 6. The closed arrows denote the flow of flux from the P1 to the P2 pole for a low or medium write current of less than 40 mA. However, for a high write current (larger than 40 mA), the P1 pedestal becomes magnetically saturated in constricted region 45 (P1B), causing excess flux to go through to P2. from the backside of 62 (P1C) as indicated by open white arrow 61. This prevents said excess flux from appearing at the ABS at the P1 shoulder. As shown in FIG. 6, the inner surfaces of elements 45 and 62 are coplanar.

Our preferred dimensions for the various elements that make up P1 in FIG. 6 are: summarized as follows:

W1 between about 1.4 and 2.6 microns; W2 between about 0.6 and 2 microns; H1 between about 0.6 and 2.5 microns; H2 less than about 3 microns; H3 between about 0.5 and 3 microns; and H4 between about 0.5 and 2 microns.

Figure 7:
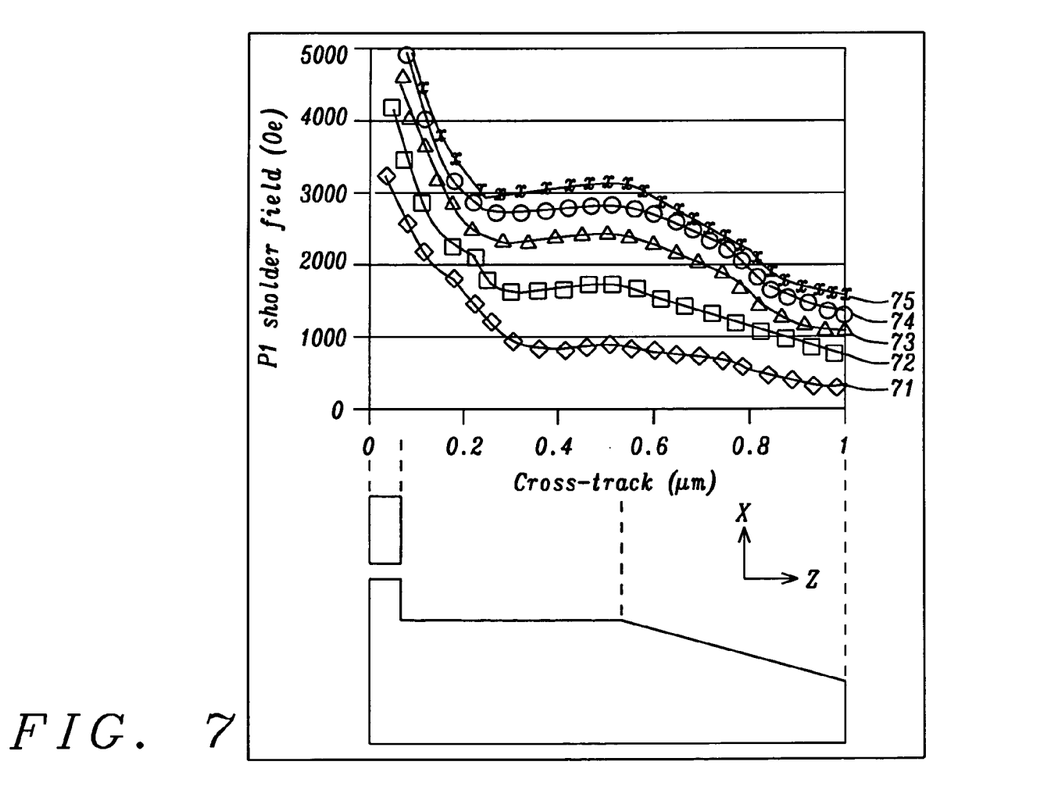
FIG. 7 plots the write field (of the invented device) as a function of distance from the write gap, illustrating how there is little or no peak in the vicinity of the P1 shoulder.

FIG. 7, like prior art FIG. 4, shows the cross track profiles of the Pi shoulder field in a planar write head with the P1 structure of FIG. 6. In the region of write currents less than 40 mA, both P1 shoulder field profiles are quite similar. But in case of high write current of 60 mA (curve 75), the P1 structure of the invention shows much smaller field strength (compare with curve 45 in FIG. 4).

Figure 8:
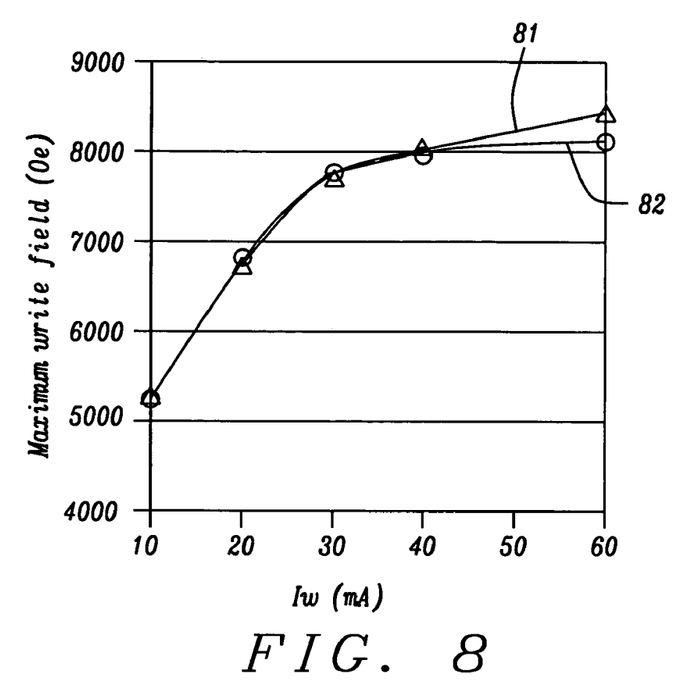
FIG. 8 plots the maximum write field, as a function of write current, for both the invention and a prior art device.

FIG. 8 shows the write current dependence of the maximum write field, which is derived from the write gap, for both P1 structures. Both write fields show similar values up to a 40 mA write current but in the range over 40 mA write current, the write field of the conventional P1 continues to increase with increasing the write current (curve 81) while the write field of the invention's P1 levels off and becomes insensitive to the write current.

This reduced sensitivity to such high write current is very effective to prevent a write resolution degradation and magnetic write width growth due to the over saturation of a recording medium.

Figure 9:
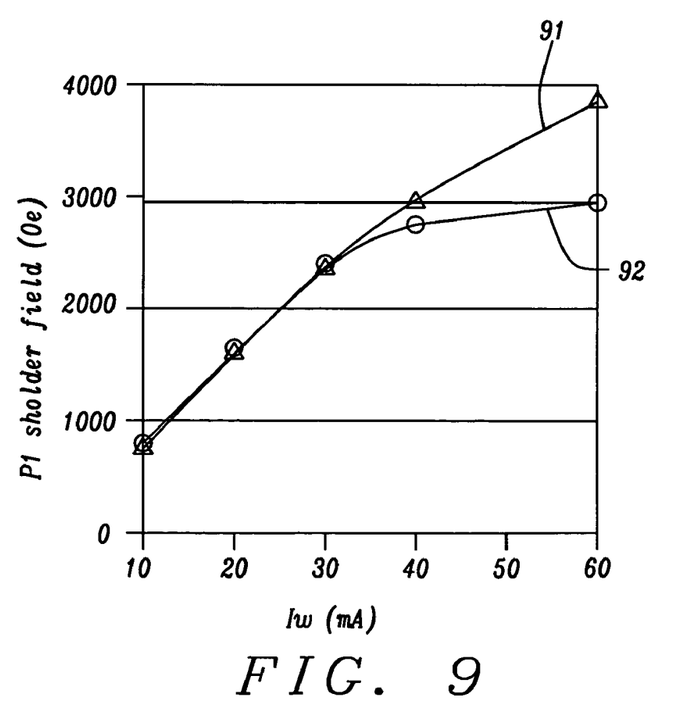
FIG. 9 plots the P1 shoulder field, as a function of write current, for both the invention and a prior art device.
Figure 10:
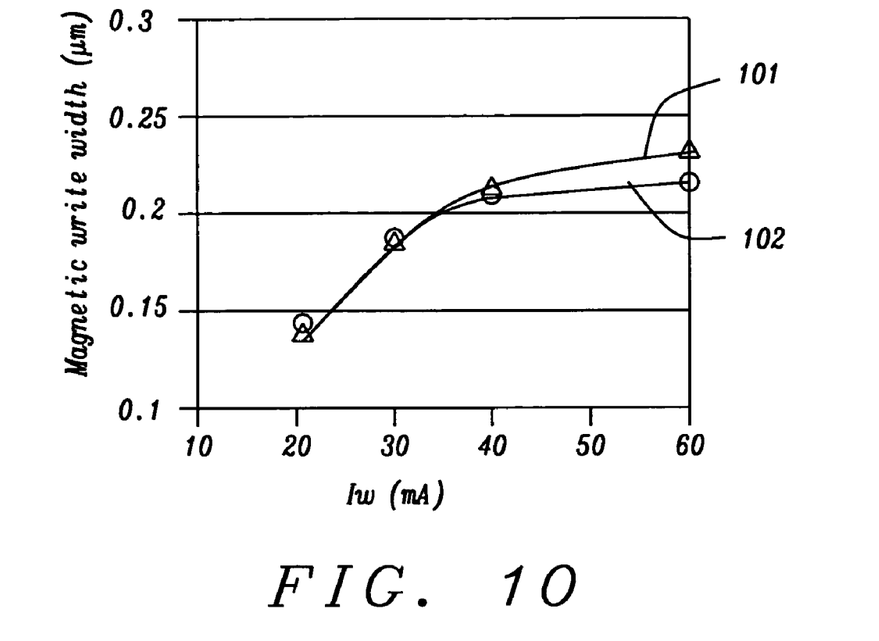
FIG. 10 plots the magnetic write width, as a function of write current, for both the invention and a prior art device.

FIG. 9 shows the write current dependence of the P1 shoulder field. The invention's P1 structure (curve 92) shows a smaller P1 shoulder field for write currents over 30 mA than seen for shoulder fields in a prior art device (curve 91), this tendency becoming more conspicuous especially for high write currents. Consequently the invention's P1 can provide less adjacent track erasures (FIG. 9) as well as less degradation of the write resolution and a stable magnetic write width (compare curve 102 of the invention with prior art curve 101 in FIG. 10).

Although we have employed the first embodiment, as shown in FIG. 6, as a vehicle for explaining the modus operandi of the invention, it will be understood that variations on this basic design are possible without reducing the effectiveness of the invention. With this in mind, we provide examples of three more embodiments below.

2<sup>nd</sup> Embodiment

Figure 11:
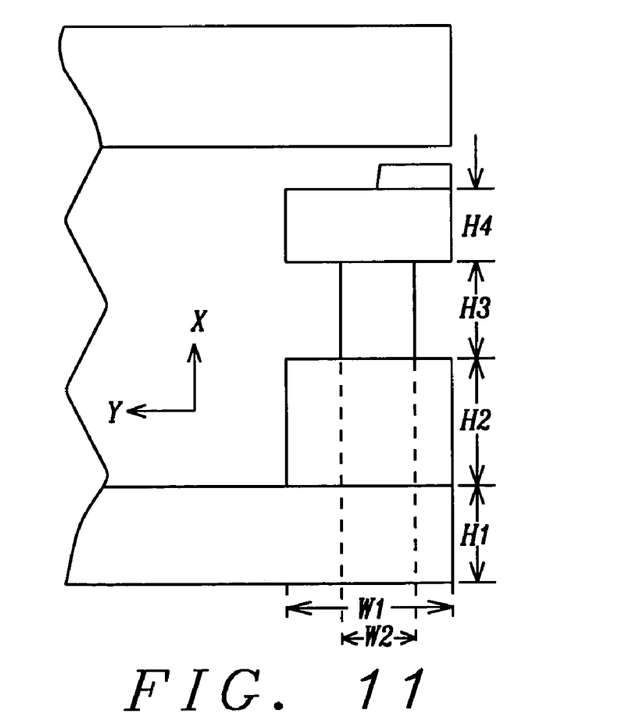
FIGS. 11-13 present three alternative embodiments of the invention.

This is illustrated in FIG. 11. Preferred dimensions for the various elements of which it is composed are as follows:

W1 between about 1.4 and 2.6 microns; W2 between about 0.6 and 2 microns; H1 between about 0.6 and 2.5 microns; H2 less than about 3 microns; H3 between about 0.5 and 3 microns; and H4 between about 0.5 and 2 microns.

3<sup>rd</sup> Embodiment

Figure 12:
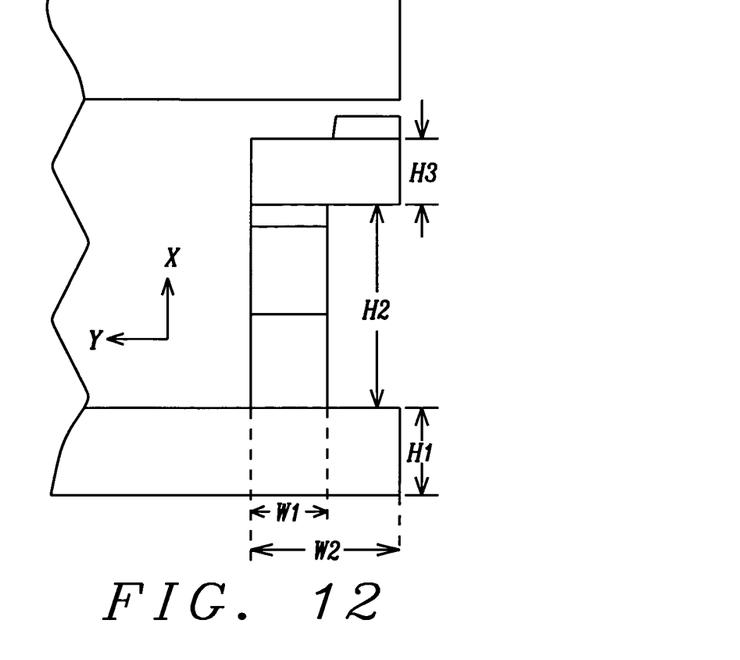

This is illustrated in FIG. 12. Preferred dimensions for the various elements of which it is composed are as follows:

W1 between about 0.6 and 2 microns; W2 between about 1.4 and 2.6 microns; H1 between about 0.6 and 2.5 microns; H2 between about 1 and 5 microns; and H3 between about 0.5 and 2 microns.

4<sup>th</sup> Embodiment

Figure 13:
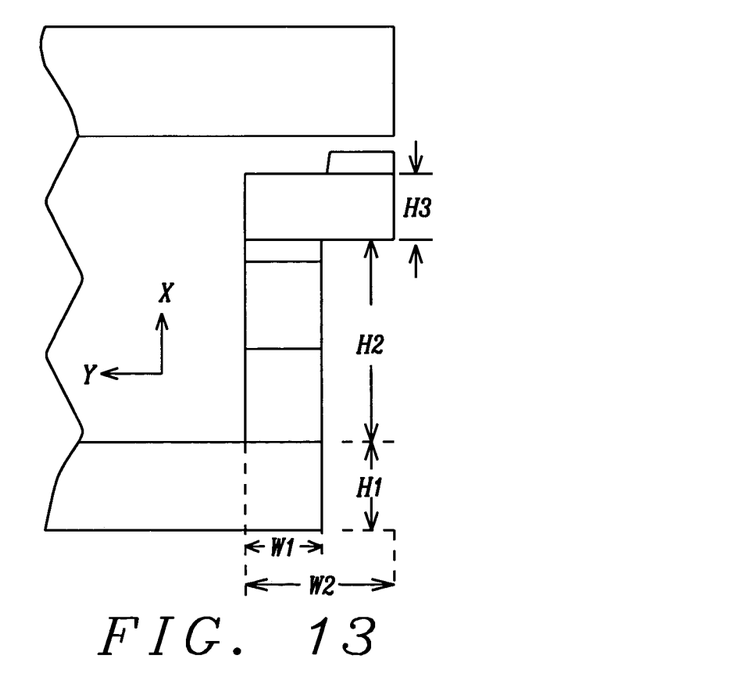

This is illustrated in FIG. 13. Preferred dimensions for the various elements of which it is composed are as follows:

W1 between about 0.6 and 2 microns; W2 between about 1.4 and 2.6 microns; H1 between about 0.6 and 2.5 microns; H2 between about 1 and 5 microns; and H3 between about 0.5 and 2 microns. As shown in FIG. 13, the elements denoted by heights H1 and H2 are coplanar for both their inner and outer surfaces.

Figure 14:
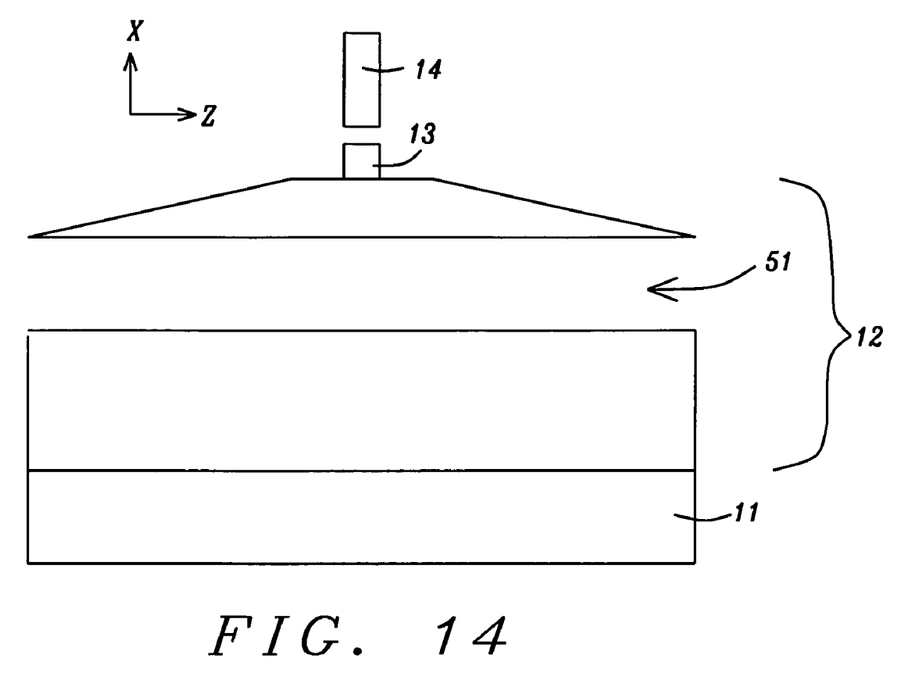
FIGS. 14 and 15 present two possible shapes (ABS view) for P1 .
Figure 15:
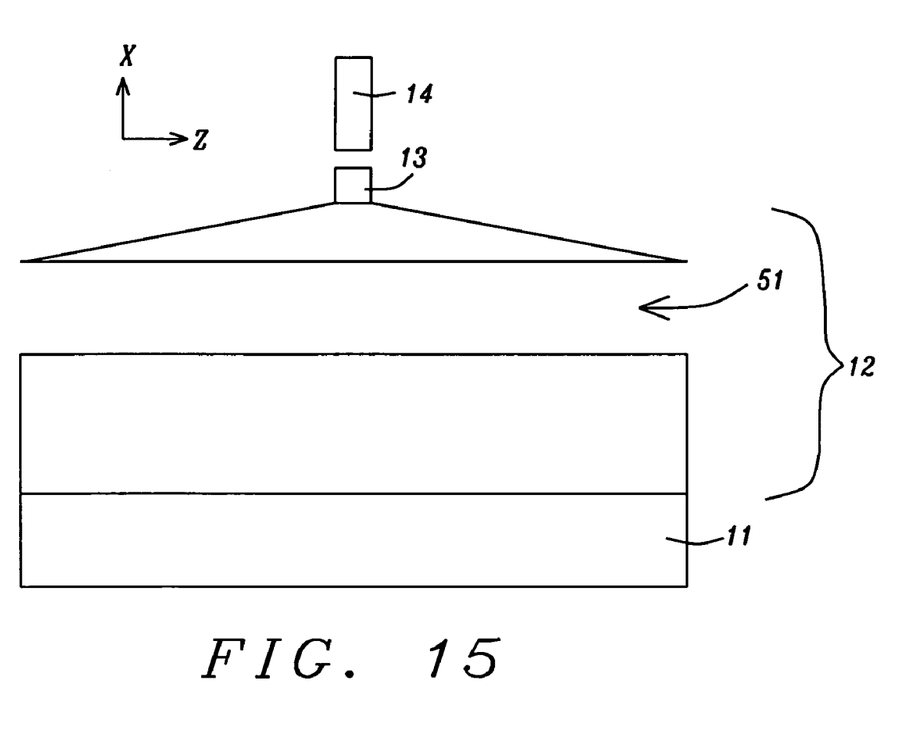

We conclude by noting that P1C (element 12 in various figures) can be shaped to have sloping sides (when viewed in the Y direction). Two examples of this are shown. In FIG. 14, the slope is such that P1C is topped by a flat area that is 6 or 7 times the width of element 13. In FIG. 15 said slope is reduced so that the top surface of P1C is no wider than that of element 13.

What is claimed is:

1. A magnetic write head comprising:
   an ABS and top and bottom poles separated by a write gap;
   said bottom pole further comprising:
   a first lower part having a first height, an outer surface that is coplanar with the ABS, and a first width;
   on said first lower part, a second lower part having a second height, a second width that is less than said first width, an outer surface that is coplanar with the ABS, and an opposing inner surface
   on said second lower part, a third lower part having a third height, a third width that is less than said second width, and an inner surface that is coplanar with that of said second part;
   on said third lower part, a fourth lower part having a fourth height, an inner surface that is coplanar with said second and third parts' inner surfaces, and an outer surface that is coplanar with the ABS, whereby a recess is present in the ABS; and
   a flux concentration sub-pole on said fourth lower part.

2. The magnetic write head described in claim 1 wherein said first height is between about 0.6 and 2.5 microns.

3. The magnetic write head described in claim 1 wherein said first width is between about 1.4 and 2.6 microns.

4. The magnetic write head described in claim 1 wherein said second height is less than about 3 microns.

5. The magnetic write head described in claim 1 wherein said second width is between about 0.6 and 2 microns.

6. The magnetic write head described in claim 1 wherein said third height is between about 0.5 and 3 microns.

7. The magnetic write head described in claim 1 wherein said third width is between about 1.4 and 2.6 microns.

8. The magnetic write head described in claim 1 wherein said fourth height is between about 0.5 and 2 microns.

9. A magnetic write head comprising:
   an ABS and top and bottom poles separated by a write gap;
   said bottom pole further comprising:
   a first lower part having a first height, a first width, and an outer surface that is coplanar with the ABS;
   on said first lower part, a second lower part having a second height, a second width that is less than said first width, and an outer surface that is coplanar with the ABS;
   centrally disposed on said second lower part, a third lower part having a third height, and a third width that is less than said second width;
   symmetrically disposed on said third lower part, a fourth lower part, having a fourth height, an inner surface that is coplanar with that of said second lower part, and an outer surface that is coplanar with the ABS, whereby a recess is present in the ABS; and a flux concentration sub-pole on said fourth lower part.

10. The magnetic write head described in claim 9 wherein said first height is between about 0.6 and 2.5 microns.

11. The magnetic write head described in claim 9 wherein said first width is between about 1.4 and 2.6 microns.

12. The magnetic write head described in claim 9 wherein said second height is less than about 3 microns.

13. The magnetic write head described in claim 9 wherein said second width is between about 0.6 and 2 microns.

14. The magnetic write head described in claim 9 wherein said third height is between about 0.5 and 3 microns.

15. The magnetic write head described in claim 9 wherein said third width is between about 1.4 and 2.6 microns.

16. The magnetic write head described in claim 9 wherein said fourth height is between about 0.5 and 2 microns.

17. A magnetic write head comprising:

an ABS and top and bottom poles separated by a write gap;

said bottom pole further comprising:

a first lower part having a first height, a first width, and an outer surface that is coplanar with the ABS;

on said first lower part, a second lower part having a second height, a second width that is less than said first width, and outer surface that is inwardly displaced from the ABS by an amount;

on said second lower part, a third lower part having a third height, a third width, an inner surface that is coplanar with that of said second lower part, and an outer surface that is coplanar with the ABS, whereby a recess is present in the ABS; and a flux concentration sub-pole on said third lower part.

18. The magnetic write head described in claim 17 wherein said first height is between about 0.6 and 2.5 microns.

19. The magnetic write head described in claim 17 wherein said first width is between about 0.6 and 2 microns.

20. The magnetic write head described in claim 17 wherein said second height is between about 1 and 5 microns.

21. The magnetic write head described in claim 17 wherein said second width is between about 1.4 and 2.6 microns.

22. The magnetic write head described in claim 17 wherein said third height is between about 0.5 and 2 microns.

23. The magnetic write head described in claim 17 wherein said third width is between about 1.4 and 2.6 microns.

24. The magnetic write head described in claim 17 wherein said amount that said outer surface of said second lower part is inwardly displaced from the ABS is between about 0.4 and 1.5 microns.

25. A magnetic write head comprising:

an ABS and top and bottom poles separated by a write gap;

said bottom pole further comprising:

a first lower part having a first height, a first width, and an outer surface that is inwardly displaced from the ABS by an amount;

on said first lower part, a second lower part having a second height, a second width that is less than said first width, and an outer edge that is coplanar with that of said first lower part;

on said second lower part, a third lower part having a third height, a third width, an inner surface that is coplanar with that of said second lower part, and an outer surface that is coplanar with the ABS, whereby a recess is present in the ABS; and a flux concentration sub-pole on said third lower part.

26. The magnetic write head described in claim 25 wherein said first height is between about 0.6 and 2.5 microns.

27. The magnetic write head described in claim 25 wherein said first width is between about 0.6 and 2 microns.

28. The magnetic write head described in claim 25 wherein said second height is between about 1 and 5 microns.

29. The magnetic write head described in claim 25 wherein said second width is between about 1.4 and 2.6 microns.

30. The magnetic write head described in claim 25 wherein said third height is between about 0.5 and 2 microns.

31. The magnetic write head described in claim 25 wherein said third width is between about 1.4 and 2.6 microns.

32. The magnetic write head described in claim 25 wherein said amount that said outer surface of said first lower part is inwardly displaced from the ABS is between about 0.4 and 1.5 microns.

* * * * *